US007091966B2

(12) United States Patent
Aoki et al.

(10) Patent No.: US 7,091,966 B2
(45) Date of Patent: Aug. 15, 2006

(54) ELECTRO-OPTICAL DEVICE, DRIVE DEVICE AND DRIVE METHOD FOR ELECTRO-OPTICAL DEVICE, AND ELECTRONIC APPARATUS

(75) Inventors: Toru Aoki, Shiojiri (JP); Kenya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 10/600,841

(22) Filed: Jun. 23, 2003

(65) Prior Publication Data

US 2004/0032630 A1 Feb. 19, 2004

(30) Foreign Application Priority Data

Jul. 11, 2002 (JP) ............................ 2002-203002
May 2, 2003 (JP) ............................ 2003-127325

(51) Int. Cl.
*G02F 1/03* (2006.01)

(52) U.S. Cl. ........................ 345/204; 345/87; 345/205; 345/206; 345/210; 349/47

(58) Field of Classification Search .................. 345/87, 345/92, 94, 204, 205, 206, 208, 210, 202; 349/47
See application file for complete search history.

(56) References Cited

U.S. PATENT DOCUMENTS 5,587,722 A 12/1996 Suzuki et al.
5,657,041 A * 8/1997 Choi ........................... 345/99
5,699,078 A * 12/1997 Yamazaki et al. ............ 345/89
6,046,717 A * 4/2000 Taniguchi et al. ............ 345/96
6,300,930 B1 * 10/2001 Mori ........................... 345/94
6,313,818 B1 * 11/2001 Kondo et al. ................. 345/89
2001/0050799 A1 * 12/2001 Murade ...................... 359/245
2002/0047552 A1 * 4/2002 Sano et al. .............. 315/169.2

FOREIGN PATENT DOCUMENTS

CN 1224180 A 7/1999
EP 0 927 986 A1 7/1999
GB 2 326 013 12/1998
GB 2 341 714 A 3/2000
JP A 01-219827 1/1989
JP 02-74989 3/1990
JP A 02-129618 5/1990
JP 05-341263 12/1993
JP 06-3647 1/1994
JP 06-11035 4/1994
JP 09-81090 3/1997
JP 2002-99256 4/2002
TW 375688 12/1999

* cited by examiner

*Primary Examiner*—Bipin Shalwala
*Assistant Examiner*—Vincent E. Kovalick
(74) *Attorney, Agent, or Firm*—Oliff & Berridge, PLC

(57) ABSTRACT

A plurality of pixel electrodes, TFTs to control the switching of the pixel electrodes, scan lines to supply scan lines to the gates of the TFTs, and data lines to supply image signals to the pixel electrodes via the TFTs when the TFTs are put into an ON state are provided on a substrate. A scan-signal supply circuit to line-sequentially supply the scan signals is further provided. The scan-signal supply circuit holds the scan signals to an intermediate potential for a predetermined period in the middle of changing the potential of the scan signals between a high potential that puts the TFTs into the ON state and a low potential that puts the TFTs into the OFF state.

17 Claims, 10 Drawing Sheets

ELECTRO-OPTICAL DEVICE, DRIVE DEVICE AND DRIVE METHOD FOR ELECTRO-OPTICAL DEVICE, AND ELECTRONIC APPARATUS

BACKGROUND OF THE INVENTION

1. Field of Invention

The present invention relates to electro-optical devices, such as liquid crystal devices. More particularly, the present invention relates to a type of electro-optical device that has transistors to control the switching of pixel electrodes arranged in a matrix and that performs active-matrix driving by sequentially supplying scan signals to scan lines provided for corresponding pixel rows, a drive device and a drive method which are preferably used for such an electro-optical device, and an electronic apparatus having such an electro-optical device.

2. Description of Related Art

The electro-optical device of this type has, in an image display area on a substrate, pixel electrodes, thin-film transistors (hereinafter "TFTs") to switch the pixel electrodes, scan lines to supply scan signals to the corresponding TFTs, data lines to supply image signals to the sources of the TFTs, storage capacitors connected to the pixel electrodes, and the like. Drive circuits, including a scan-line drive circuit to supply scan signals to the scan lines, a data-line drive circuit to supply image signals to the data lines, and a sampling circuit, are provided at peripheral regions located around the image display area.

More specifically, the scan-line drive circuit line-sequentially supplies a scan signal having a pulsed waveform for each scan line or each row. That is, scan signals are supplied such that, at the same time when TFTs that are connected to the mth row (m is a natural number) are turned off, TFTs that are connected to the (m+1)th scan line are turned on. In parallel, the data-line drive circuit supplies image signals to the respective data lines in each horizontal-scanning period so as to write the image signals to corresponding pixel electrodes from the sources of the TFTs that are turned on by the scan signals through the drains thereof. The supply of such scan signals and image signals then causes the writing of an image for one row in a single horizontal-scan period. In addition, the electro-optical device is configured such that the above write operation is sequentially performed on all the rows in a vertical scan period to thereby write an image corresponding to one frame.

However, since the TFTs, the scan lines, capacitance lines, the data lines, and the like are fabricated in gaps between the pixel electrodes that are arranged in a plain matrix, parasitic capacitances are generated between the pixel electrodes in the (m+1)th row and the drains of the TFTs, the scan lines, the capacitance lines, and the like in the mth row. As a result, when the TFTs in the (m+1)th row are turned on by using scan signals having a pulsed waveform at a moment when the TFTs in the mth row are turned off, a scan signal or the like in the (m+1)th row is introduced as noise into an image signal written into the pixel electrodes in the mth row. This causes the pixel potentials, which are essentially to be held by the corresponding pixel electrodes, to fluctuate. In particular, since the parasitic capacitances are different depending on pixel units, there is a problem in that pixel irregularities occur in an image that is eventually displayed.

Furthermore, the above problem becomes more severe as the pixel pitch is reduced so as to meet a common requirement for higher definition of a displayed image in the art, since the parasitic capacitances between the pixel electrode in the (m+1)th row and the drains of the TFTs, the scan lines, the capacitance lines, and the like in the mth row become relatively large as the pixel pitch is increased.

Additionally, the waveform of scan signals is rounded depending on the corresponding wire capacitances. Thus, the degree to which the waveform of scan signals is rounded is greater at the center portion, which is farther from the scan-line drive circuit, of the image display area than at a peripheral portion, which is adjacent to the scan-line drive circuit, of the image display region. Thus, the ON/OFF timings of the TFTs are different between the peripheral portion and the center portion, depending on the degree to which the waveform of the scan signals is rounded. As a result, the influences of noise due to the next row's scan signal that is introduced into an image signal when the TFTs are turned off, as described above, are also different from each other between the peripheral portion and the center portion. Thus, in particular, in order to prevent flicker and/or aging of liquid crystal and the like, when AC inversion driving in which a drive potential of each pixel electrode is inverted in each field period or the like is adopted, adjusting the potential of the opposing electrode such that no DC component is generated in a potential applied to the liquid crystal causes such a DC component to be generated at the peripheral portion. Conversely, adjusting the potential of the scan signal or the like such that no DC component is generated in a potential applied to the liquid crystal at the peripheral portion of the image display area causes such a DC component to be generated at the center portion. For these reasons, a problem occurs in that flicker is generated at the peripheral portion or the center portions.

Meanwhile, when the mth-row's scan line and the mth-row's TFTs that are driven therethrough are considered, the pulsed waveform of a scan signal affects the pixel potentials at the drains of the TFTs since parasitic capacitances exist between the scan line and the drains. Specifically, at a moment when the corresponding gates are turned off, a pulsed potential corresponding to a pulsed waveform in the scan line is superimposed as noise on the potential of an image signal and the resulting potential is held as a pixel potential. Thus, in this case, the influences of noise introduced to image signals are different from each other between the peripheral portion and the center portion, because the degrees to which the waveform of the scan signals is rounded are different between the peripheral portion and the center portion. As a result, potentials applied to the liquid crystal are different and the luminance levels are also different. A problem also occurs in that flicker is generated at either of the peripheral portion and the center portion. In order to reduce or prevent the generation of such flicker, Japanese Unexamined Patent Application Publication No. 6-110035 discloses a technique of shaping the rising waveform of a scan signal, not into a rectangular waveform, but into a ramp waveform or a stepped waveform. This approach, however, cannot prevent the generation of pixel irregularities and flicker which result from parasitic capacitances between the pixel electrodes in the (m+1)th row and the drains of the TFTs, scan lines, capacitance lines, and the like in the mth row.

SUMMARY OF THE INVENTION

The present invention addresses the above and/or other problems, and provides an electro-optical device that is capable of reducing brightness irregularities and flicker at both the center portion and the peripheral portion of an image display area and that is capable of displaying a high-quality image, a drive device and a drive method which are preferably used for such an electro-optical device, and an electronic apparatus having such an electro-optical device.

To address or overcome the above, an electro-optical device according to the present invention includes a plurality of pixel electrodes that are arranged in a matrix above a substrate, thin-film transistors that are arranged above the substrate to control the switching of the pixel electrodes, scan lines that are provided above the substrate to supply scan signals to put the thin-film transistors into an ON state or an OFF state to the gates of the thin-film transistors, and data lines that are provided on the substrate to supply image signals to the pixel electrodes through the sources and the drains of the thin-film transistors when the thin-film transistors are put into the ON state. The electro-optical device further includes a scan-signal supply circuit that line-sequentially supplies the scan signals to the scan lines. In the middle of changing the potential of the scan signals from a high potential that puts the thin-film transistors into the ON state to a low potential that puts the thin-film transistors into the OFF state and in the middle of changing the potential of the scan signals from the low potential to the high potential, the scan-signal supply circuit holds the potential of the scan signals to an intermediate potential between the high potential and the low potential for a predetermined period.

According to the electro-optical device of the present invention, during operation, the scan signals are line-sequentially supplied to the gates of the thin-film transistors from the scan-signal supply circuit through the scan lines provided above the substrate. In parallel, the image signals are supplied to the sources of the thin-film transistors through the data lines. In response, the image signals are written into the corresponding pixel electrodes through the thin-film transistors that are put into the ON-state by the scan signals. This allows for an electro-optical operation of an active-matrix drive system.

In this case, particularly, the scan-signal supply circuit holds the potential of the scan signals to an intermediate potential for a predetermined period, in the middle of changing the potential of the scan signals from the high potential to the low potential. In addition, the scan-signal supply circuit holds the potential of the scan signals to the intermediate potential for a predetermined period, in the middle of changing the potential of the scan signals from the low potential to the high potential. Thus, when the scan lines in the mth and (m+1)th rows are considered, a period in which the potential of the scan lines in the mth row falls from the high potential to the intermediate potential and a period in which the potential of the scan lines in the (m+1)th row rises from the low potential to the intermediate potential can be overlapped with each other. Alternatively, a period in which the potential of the scan lines in the mth row falls from the high potential to the intermediate potential and a period in which the potential of the scan lines in the (m+1)th row rises from the low potential to the intermediate potential can be overlapped with each other. As a result, at the time of turning off the TFTs in the mth row, even when a scan signal or the like in the (m+1)th scan row is introduced as noise into an image signal written into the pixel electrodes in the mth row in response to parasitic capacitances between the pixel electrodes in the (m+1)th row and the drains of the thin-film transistors, scan lines, and the like in the mth row, the amount of variation in the pixel potentials, which are essentially to be held by the corresponding pixel electrodes, is reduced since the transistors in the mth row are not completely turned off. Thus, compared to a case in which the scan signals are changed directly from the high potential to the low potential or a case in which the scan signals are changed directly from the low potential to the high potential, the amount of noise relative to the amount of such parasitic capacitances can be reduced by reducing the amount of potential change in the scan signals at one point. Thus, while such parasitic capacitances are irregular depending on pixel units, pixel irregularities generated in an image that is eventually displayed can be reduced. Thus, even when such parasitic capacitances become relatively large due to a reduced pixel pitch, adverse effects on the image can be reduced.

In addition, when AC inversion driving is adopted, the waveform of scan signals can be adjusted so that no difference in DC components is generated in the pixel potentials in both the center and peripheral portions of the image display area. Thus, flicker can be reduced at both regions. Similarly, with regard to adverse effects that the scan signals or the like have on the pixel potentials due to parasitic capacitances that exist between the scan lines in the mth row and the drains of the TFTs in the mth row which are driven therethrough can be made substantially the same between the peripheral portion and the center portion. During AC inversion, flicker at both the peripheral portion and the center portion can be reduced as well.

As a result, pixel irregularities and/or flicker can be reduced at both the center portion and the peripheral portion of the image display area and a high-quality image can be displayed.

According to one aspect of the electro-optical device of the present invention, the scan-signal supply circuit supplies the scan signals so that, a period in which, of two scan signals supplied to the adjacent scan lines, one scan signal that precedes is changed from the intermediate potential to the low potential and a period in which the other scan signal that follows is changed from the low potential to the intermediate potential overlap each other.

According to this aspect, a period in which a scan signal that precedes in a scan line in the mth row changes from the high potential to the intermediate potential and a period in which a scan signal that follows in the scan line in the (m+1)th row changes from the low potential to the intermediate potential overlap with each other. Thus, even when a scan signal or the like in the (m+1)th row is introduced as noise into an image signal written into the pixel electrode in the mth row, the amount of noise can be reduced compared to a case in which the scan signals are changed directly between the high potential and the low potential.

According to another aspect of the electro-optical device of the present invention, the intermediate potential is set to a potential that puts the thin-film transistors into an incomplete ON state.

According to this aspect, when the thin-film transistors in the mth row are put into an incomplete OFF state from the complete ON state, the thin-film transistors in the (m+1)th row are put into the incomplete OFF state from the complete OFF state. Thus, even when a scan signal or the like in the (m+1)th row is introduced as noise into an image signal written into the pixel electrode in the mth row, the amount of noise can be reduced compared to a case in which the thin-film transistors are changed directly between the complete ON state and the complete OFF state.

According to another aspect of the electro-optical device of the present invention, in the middle of changing the potential of the scan signals from the high potential to the low potential, the scan-signal supply circuit holds the potential of the scan signals to a plurality of potentials for respective predetermined periods. The plurality of potentials are different from each other include the intermediate potential. Further, in the middle of changing the potential of the scan lines from the low potential to the high potential, the scan-signal supply circuit holds the potential of the scan signals to a plurality of potentials for respective predetermined periods. The plurality of potentials are different from each other and include the intermediate potential.

According to this aspect, the potential of the scan signals changes in a stepped pattern when changing between the high potential and the low potential. Thus, the amount of potential change in a scan signal at one point can be reduced and high-frequency components of the scan signal can be reduced, compared to a case in which the scan signals are changed directly between the high potential and the low potential. As a result, the amount of noise relative to the amount of parasitic capacitance can be reduced, as described above.

According to another aspect of the electro-optical device of the present invention, the scan-signal supply circuit includes a shift-register circuit that sequentially outputs a transfer signal to the scan lines and, an output circuit that line-sequentially outputs the scan signals to the scan lines in response to input of the transfer signal, and a power-supply changing circuit that changes an external power supply for defining the high potential at output sides of the output circuit to two values.

According to this aspect of the present invention, when in operation, the scan-signal supply circuit sequentially outputs the transfer signal to the scan lines by using the shift register circuit. In response to the transfer signal, the output circuit line-sequentially outputs the scan signals to the scan lines. In this case, particularly, the power-supply changing circuit changes the external power supply, which defines a high potential at the output sides of the output circuit, into two values. Thus, at a certain time after the potential of a scan signal in the mth row is changed from the high potential to the intermediate potential, the potential of the scan signal can further be changed from the intermediate potential to the low potential. At the same time, at a certain time after the potential of a scan signal in the (m+1)th row is changed from the low potential to the intermediate potential, the potential of the scan signal can further be changed from the intermediate potential to the high potential.

In this aspect which includes the shift-register circuit and the like, the output circuit may include inverter circuits or buffer circuits which include complementary transistor circuits whose high potential sides are connected to the external power supply.

With this arrangement, the power-supply changing circuit to change the external power supply, which defines the high potential at output sides of the inverter circuits or buffer circuits, into two values. This makes it possible to relatively easily change scan signals to an intermediate potential. The inverter circuits or the buffer circuits may have an amplifier function.

In this aspect which includes the shift-register circuit and the like, the power-supply changing circuit may include a switch that switches and outputs two power supplies.

With this arrangement, the high potential at the output sides of the output circuit can be reliably changed into two values. This makes it possible to relatively easily change scan signals to the intermediate potential.

In this aspect which includes the shift-register circuit and the like, the power-supply changing circuit includes a programmable D/A (digital-to-analog) converter that switches and outputs two power supplies.

With this arrangement, the high potential at the output sides of the output circuit can be reliably changed into two values. This makes it possible to relatively easily change scan signals to the intermediate potential.

In this aspect which includes the shift-register circuit and the like, the output circuit may include a first section that sequentially outputs the scan signals to the odd-numbered-row scan lines of the plurality of scan lines and a second section that sequentially outputs the scan signals to the even-numbered-row scan lines of the plurality of scan lines. The power-supply changing circuit causes the first section and the second section to change the external power supply into two values, respectively.

With this arrangement, the first section and the second section change the potential of the scan signals to the intermediate potential. Thus, in the case in which a 1H inversion drive system in which the drive potential of the pixel electrodes are AC-inverted for each scan line, when a scan signal or the like is introduced as noise in response to the parasitic capacitance as described above, the generation of flicker can effectively be reduced or prevented.

In another aspect of the electro-optical device of the present invention, the electro-optical device further includes an opposing substrate, which opposes the substrate, and an electro-optic material layer that is sandwiched between the substrate and the opposing substrate.

According to this aspect, it is possible to achieve an electro-optical device, such as a liquid-crystal device, in which an electro-optic material layer is sandwiched between a pair of a substrate and an opposing substrate.

To address or overcome the problems described above, a drive device for an electro-optical device according to the present invention includes a plurality of pixel electrodes that are arranged in a matrix above a substrate, thin-film transistors that are provided above the substrate to control the switching of the pixel electrodes; scan lines that are provided above the substrate to supply scan signals to put the thin-film transistors into an ON state or an OFF state to the gates of the thin-film transistors, and data lines that are provided above the substrate to supply image signals to the pixel electrodes through the sources and the drains of the thin-film transistors when the thin-film transistors are put into the ON state. The drive device further includes a scan-signal supply circuit. In the middle of changing the potential of the scan signals from a high potential that puts the thin-film transistors into the ON state to a low potential that puts the thin-film transistors into the OFF state and in the middle of changing the potential of the scan signals from the low potential to the high potential, the scan-signal supply circuit holds the potential of the scan signals to an intermediate potential between the high potential and the low potential for a predetermined period.

According to the drive device for an electro-optical device of the present invention, due to the same effect as in the case of the above-described electro-optical device of the present invention, pixel irregularities and/or flicker can be reduced at both the center portion and the peripheral portion of the image display area and a high-quality image can be displayed.

According to one aspect of the drive device for an electro-optical device of the present invention, the scan-signal supply circuit includes a shift-register circuit that sequentially outputs a transfer signal to the scan lines and, an output circuit that line-sequentially outputs the scan signals to the scan lines in response to input of the transfer signal, and a power-supply changing circuit that changes an external power supply to define the high potential at the output sides of the output circuit to two values.

According to this aspect, when in operation, the scan-signal supply circuit sequentially outputs the transfer signal to the scan lines by using the shift register circuit. In response to the transfer signals, the output circuit line-sequentially outputs the scan signals to the scan lines. In this case, particularly, the power-supply changing circuit changes the external power supply, which defines the high potential at the output sides of the output circuit, into two values. Thus, at a certain time after the potential of a scan signal in the mth row is changed from the high potential to the intermediate potential, the potential of the scan signal can further be changed from the intermediate potential to the low potential. At the same time, at a certain time after the potential of a scan signal in the (m+1)th row is changed from the low potential to the intermediate potential, the potential of the scan signal can further be changed from the intermediate potential to the high potential.

According to another aspect of the drive device of an electro-optical device of the present invention, the electro-optical device further includes an image-signal supply circuit that supplies the image signals to the data lines.

According to this aspect, the image-signal supply circuit can supply image signals, while the scan-signal supply circuit supplies scan signals. The drive device that includes such a scan-signal supply circuit and an image-signal supply circuit may be fabricated on a substrate for the electro-optical device or may be constructed as an external IC (integrated circuit) that is later attached to the electro-optical device.

To address or overcome the problems described above, an electronic apparatus according to the present invention includes the above-described electro-optical device (including various aspects thereof) of the present invention.

According to the electronic apparatus of the present invention, since the electronic apparatus has the above-described electro-optical device of the present invention, it is possible to achieve various electronic apparatuses that have less image irregularities and/or flicker and that are superior in display quality. Examples of such apparatuses include projectors, liquid-crystal televisions, portable telephones, electronic organizers, word processors, viewfinder-type or monitor-direct-viewing-type videotape recorders, workstations, videophones, POS terminals, and touch panels, for example.

Such effects and other advantages of the present invention will be more apparent from the exemplary embodiments described below.

DETAILED DESCRIPTION OF PREFERRED EMBODIMENTS

Exemplary embodiments of the present invention are described below with reference to the accompanying drawings. Exemplary embodiments described below are directed to a case in which an electro-optical device of the present invention is applied to a liquid crystal device.

First Exemplary Embodiment

A first exemplary embodiment of an electro-optical device of the present invention is described below with reference to FIGS. 1 to 5.

Figure 1:
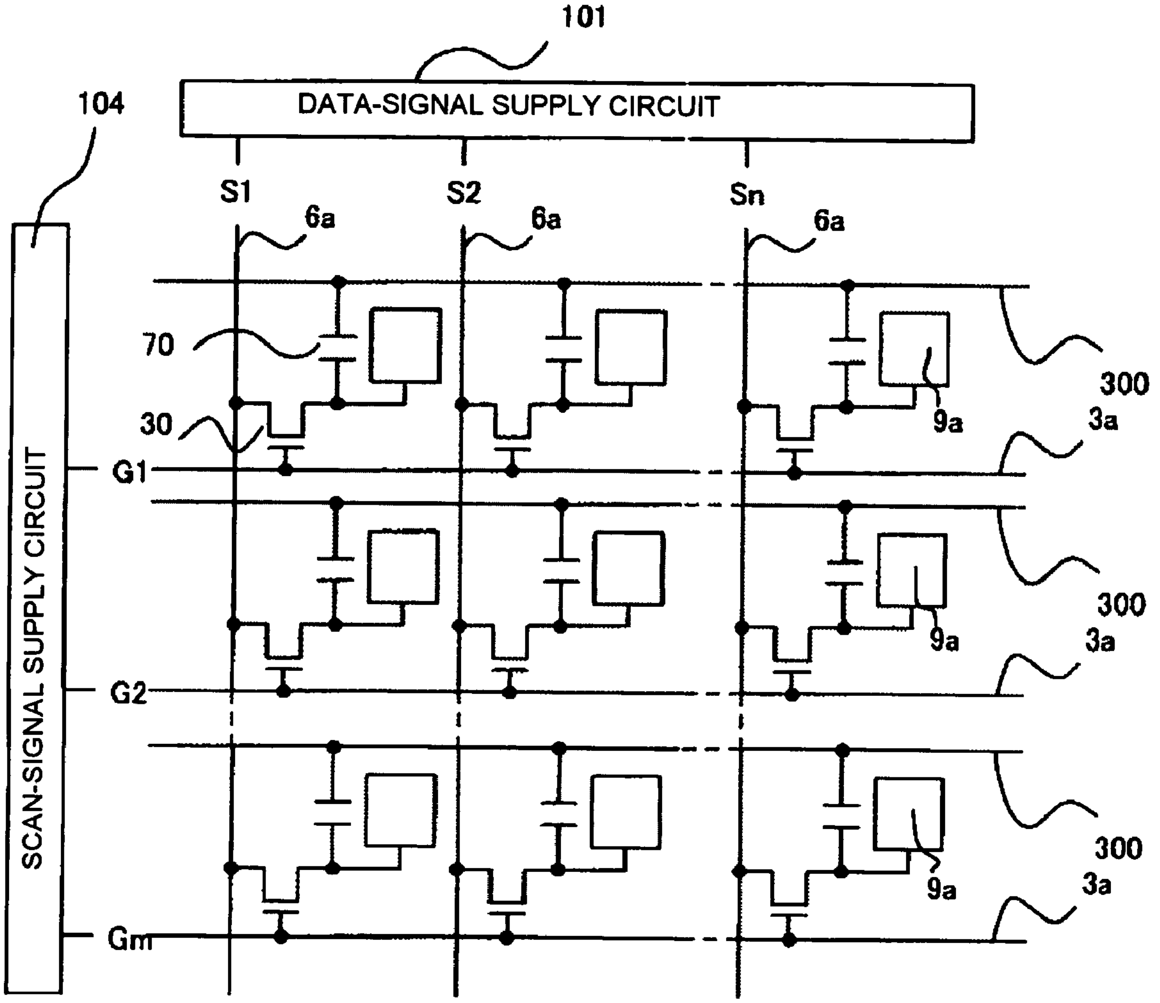
FIG. 1 is a schematic circuit diagram showing an equivalent circuit of various elements, wires, and the like which are provided for a plurality of pixels that are formed in a matrix to constitute an image display area in an embodiment of an electro-optical device of the present invention, in conjunction peripheral drive circuits therefor.
Figure 2:
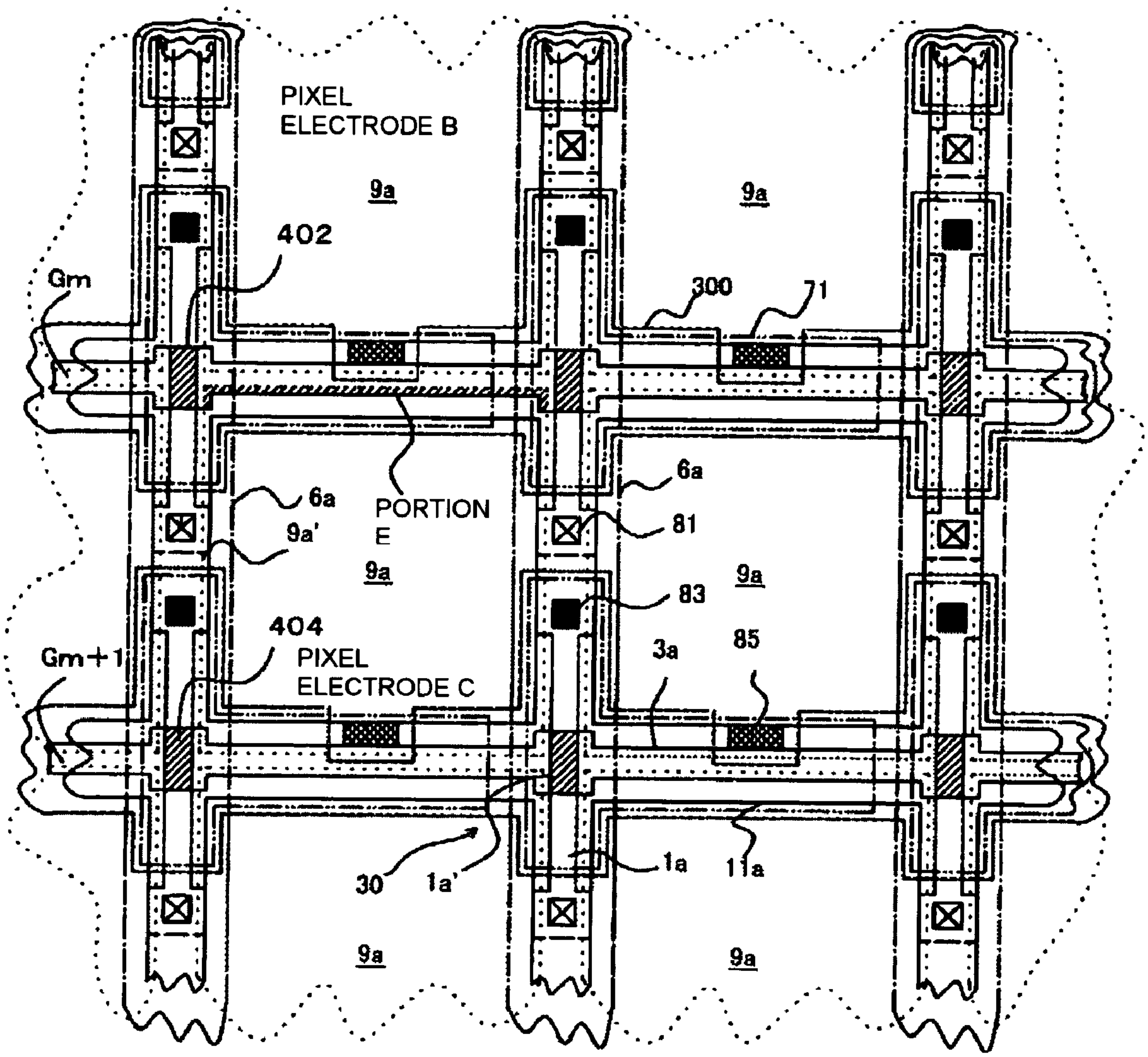
FIG. 2 is a plan view of a TFT-array substrate on which data lines, scan lines, pixel electrodes, and the like are formed, in the electro-optical device of this exemplary embodiment.
Figure 3:
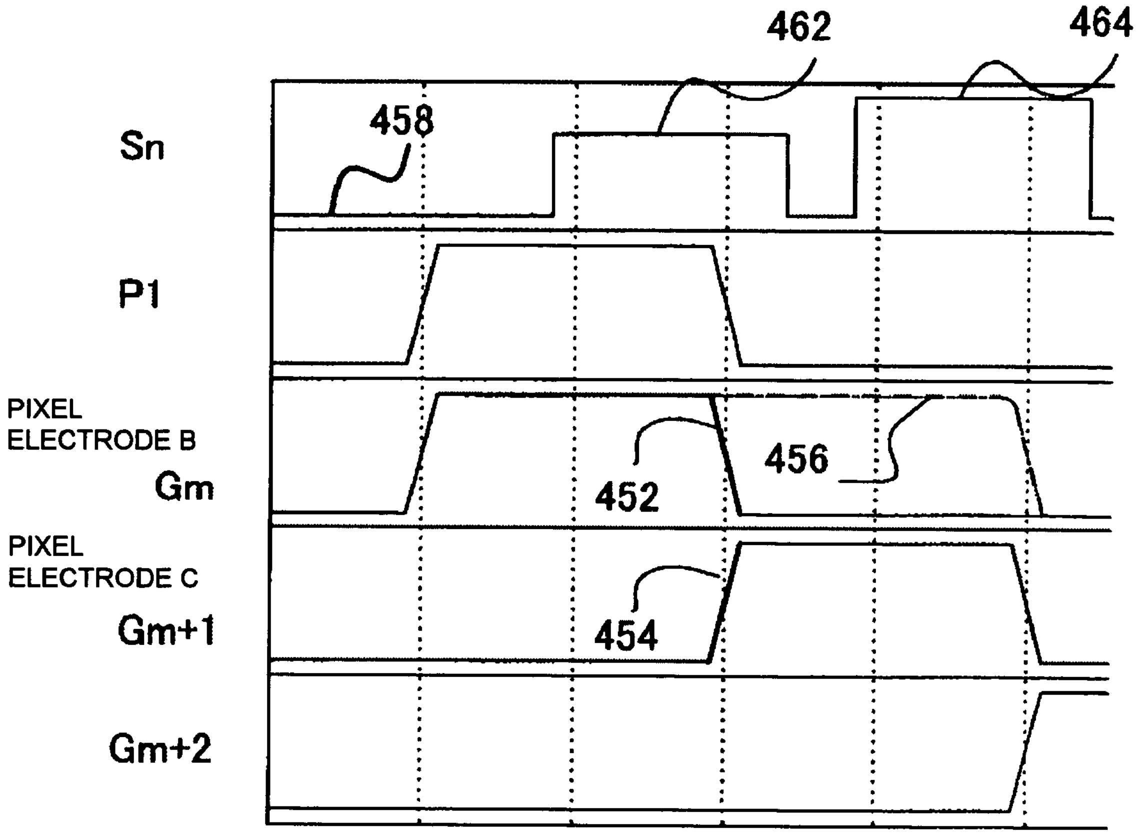
FIG. 3 is a timing chart of a data signal, scan signals, and the like in a comparative example.

First, the basic configuration of the electro-optical device of the first exemplary embodiment is described with reference to FIGS. 1 to 3. FIG. 1 is a schematic circuit diagram showing an equivalent circuit of various elements, wires, and the like for a plurality of pixels that are formed in a matrix to constitute the image display area of the electro-optical device, in conjunction with peripheral drive circuits therefor. FIG. 2 is a plan view of a group of multiple pixels that are adjacent to each other on a TFT-array substrate on which data lines, scan lines, pixel electrodes, and the like are formed. FIG. 3 is a timing chart of a data signal, scan signals, and the like in a comparative example.

Referring to FIG. 1, the plurality of pixels, which are formed in a matrix to constitute the image display area of the electro-optical device of this exemplary embodiment, have respective pixel electrodes 9*a* and TFTs 30 to control the switching of the corresponding pixel electrodes 9*a*. Data lines 6*a*, through which image signals are supplied, are electrically connected to the sources of the corresponding TFTs 30. Scan lines 3*a*, through which scan signals are supplied, are electrically connected to the gates of the corresponding TFTs 30. The pixel electrodes 9*a* and storage capacitors 70 are electrically connected to the drains of the corresponding TFTs 30.

The electro-optical device has a data-signal supply circuit 101 and a scan-signal supply circuit 104 in peripheral regions located around the image display area.

The data-signal supply circuit 101 includes a data-line drive circuit, a sampling circuit, and the like. The data-signal supply circuit 101 is configured to sample image signals on image signal lines at a predetermined timing and to sequentially write image signals S1, S2, . . . , and Sn to the corresponding data lines 6*a*.

On the other hand, the scan-signal supply circuit 104 is configured to line-sequentially supply scan signals G1, G2, . . . , and Gm in this order in a pulse manner to the corresponding scan lines 3*a at a predetermined timing.*

In this exemplary embodiment, particularly, the scan signals G1, G2, . . . , and Gm not only have a potential of a high level, which puts the TFTs 30 into an ON-state, and a potential of a low level, which puts the TFTs 30 into an OFF-state, but also can have a potential of a middle level that puts the TFTs 40 into an incomplete ON-state or an incomplete OFF-state. The details of such scan signals are described below.

In the image display area, the scan-signal supply circuit 104 line-sequentially supplies the scan signals G1, G2, . . . , and Gm to the gates of the TFTs 30 through the scan lines 3*a*. The switches of the TFTs 30, which serve as pixel switching elements, are closed for a certain period of time, so that the image signals S1, S2, . . . , and Sn, which are supplied through the data lines 6*a*, are written into the pixel electrodes 9*a* at a predetermined timing. The image signals S1, S2, . . . , and Sn, which are at certain levels and which are written into liquid crystal, which is one example of electro-optic material, via the pixel electrodes 9*a*, are held for a certain period of time between the pixel electrodes 9*a* and an opposing electrode formed on an opposing substrate, which is described below. Liquid crystal allows modulation of light by varying the orientation and order of its molecular association in accordance with the level of an applied voltage, thereby allowing for gray scale display. For a normally white mode, a transmittance for incident light is reduced for each pixel unit in accordance with an applied voltage, and for a normally black mode, a transmittance for incident light is increased for each pixel unit in accordance with an applied voltage. The electro-optical device as a whole emits light rays having contrasts in accordance with image signals. In this case, in order to reduce or prevent leakage of the held image signals, the storage capacitors 70 are provided in parallel with liquid-crystal capacitors that are formed between the pixel electrodes 9*a* and the opposing electrode. Each storage capacitor 70, as will be described below in detail, includes an image-potential-side capacitance electrode, which is connected to the corresponding pixel electrode 9*a*, and a fixed-potential-side capacitance electrode, which is arranged so as to oppose the image-potential-side capacitance electrode with a dielectric film interposed therebetween. Capacitance lines 300 having a fixed potential are arranged in parallel with the scan lines 3*a*, and a part of each capacitance line 300 serves as the fixed-potential-side capacitance electrode.

Next, as shown in FIG. 2, the plurality of transparent pixel electrodes 9*a* (whose contours are represented by dotted lines 9*a*') are provided in a matrix on the TFT-array substrate of the electro-optical device, and the data lines 6*a* and the scan lines 3*a* are respectively provided along the vertical borders and the horizontal borders of the pixel electrodes 9*a*.

The scan lines 3*a* are arranged so as to face channel regions 1*a*', which are each indicated by a region of right-upward slanted lines in FIG. 2, in a semiconductor layer 1*a*. The scan lines 3*a* include gate electrodes. The scan lines 3*a* are designed such that the width of portions for the gate electrodes that face the channel regions 1*a*' is wider.

In this manner, the pixel-switching TFTs 30, in which parts of the scan lines 3*a* are arranged as the gate electrodes so as to face the channel regions 1*a*, are arranged at the corresponding intersections of the scan lines 3*a* and the main line portions 61*a* of the data lines 6*a*.

A relay layer 71 is provided so as to serve as the pixel-potential-side capacitance electrodes, which are connected to the heavily-doped drain regions of the TFTs 30 and the pixel electrodes 9*a*. Parts of each capacitance line 300, which serve as the fixed-potential-side capacitance electrodes, are provided above the relay layer 71 along the scan line 3*a*. These are arranged so as to oppose each other with a dielectric film therebetween to form storage capacitances that are connected to the pixel electrodes 9*a*. The capacitance lines 300 extend along the corresponding scan lines 3*a* in a striped pattern in plan view and have portions that protrude upward and downward in FIG. 2 at portions that overlap the TFTs 30. Lower light-shielding films 11*a* are formed on the TFT-array substrate 10 in a lattice below the TFTs 30. Interlayer insulating films are formed on the scan lines 3*a*. The interlayer insulating films each have therein a contact hole 81, communicating from the data line 6*a* to the heavily-doped source region, and a contact hole 83, communicating from the relay layer 71 to the heavily-doped drain region. Interlayer insulating films having therein contact holes 85, communicating from the pixel electrodes 9*a* to the relay layer 71, are formed on the data lines 6*a*. Further, the pixel electrodes 9*a* are provided on the interlayer insulating films.

Figure 4:
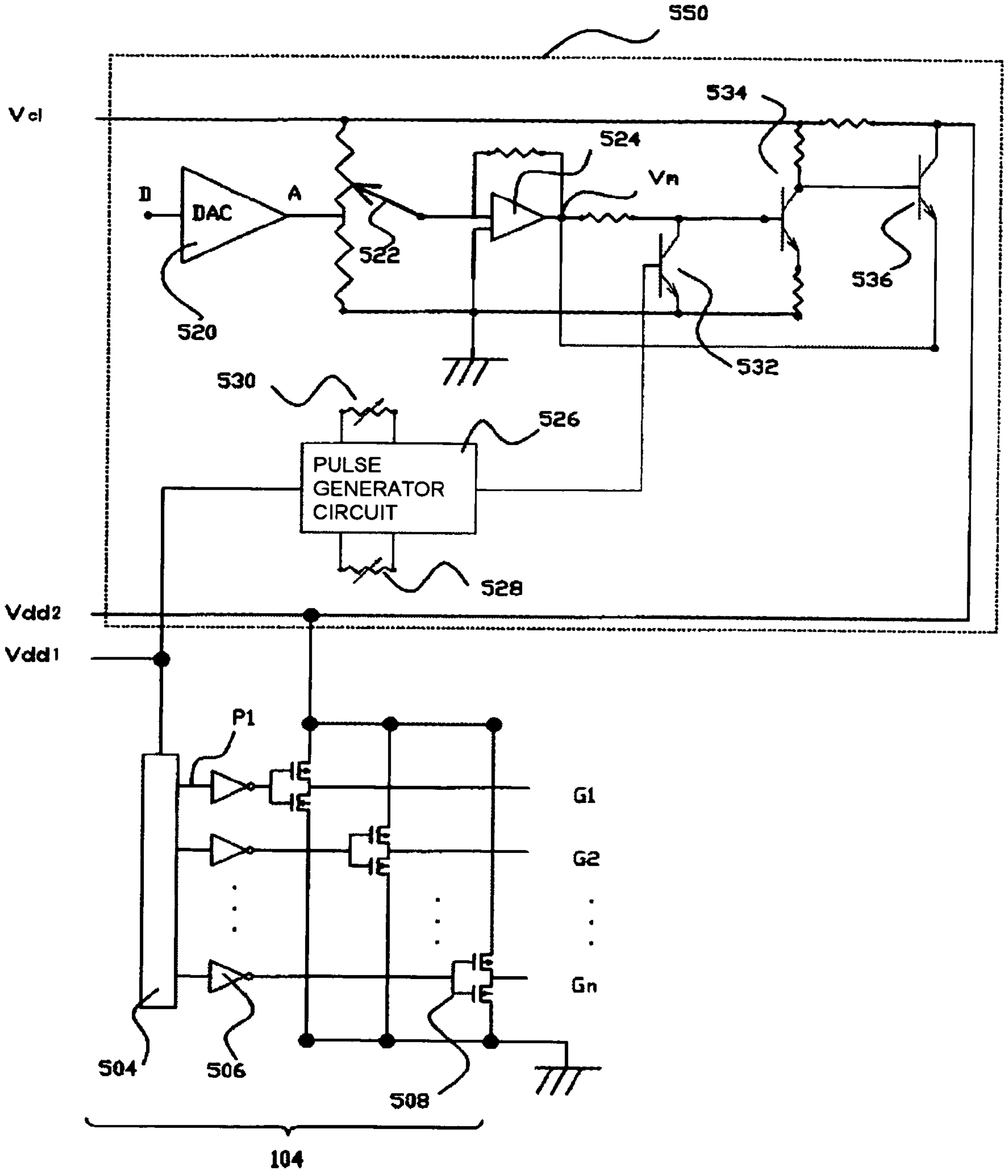
FIG. 4 is a schematic of a middle-stage wave circuit and a scan-signal supply circuit in this exemplary embodiment.
Figure 5:
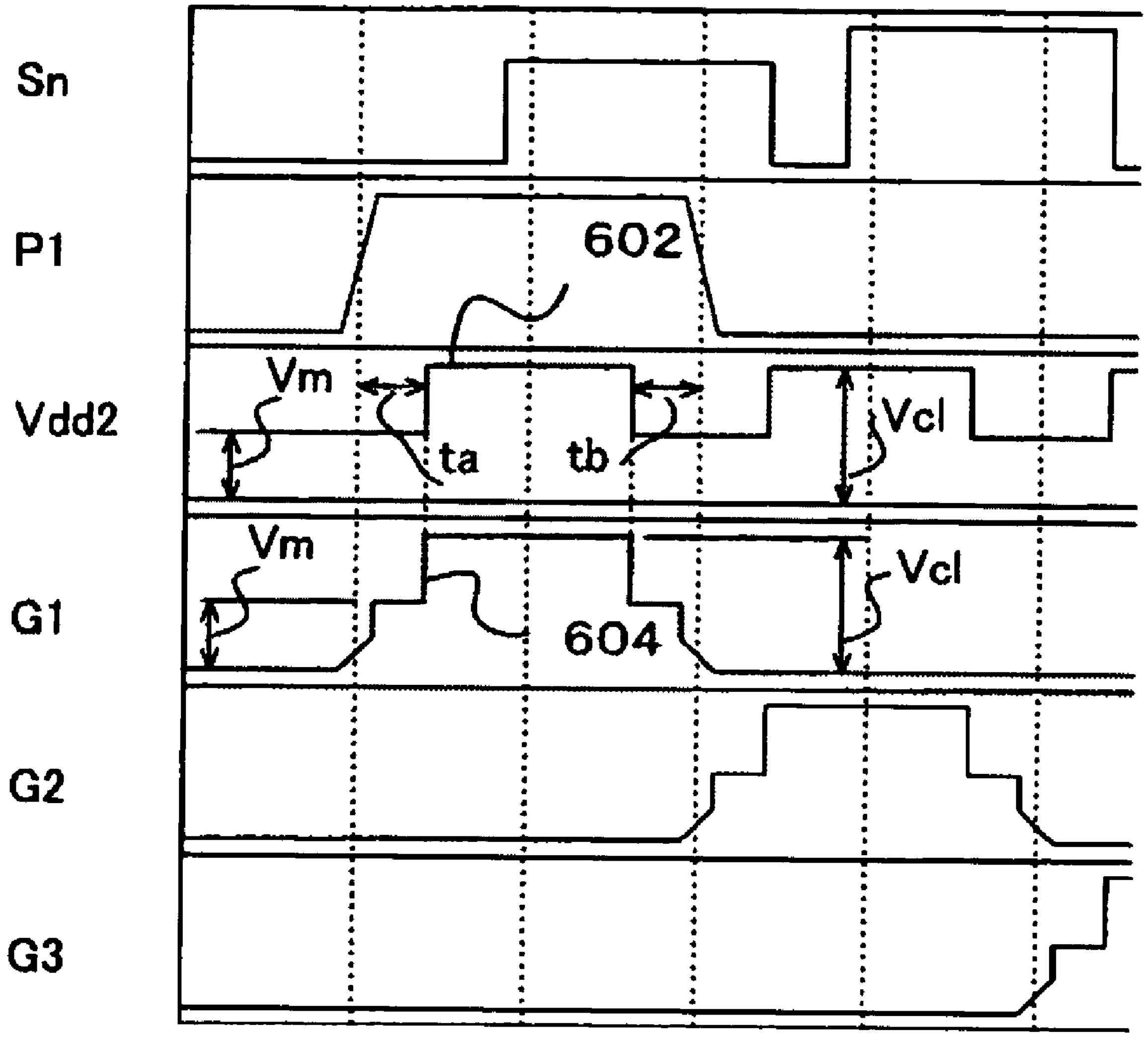
FIG. 5 is a timing chart of a data signal, scan signals, and the like in this exemplary embodiment.

Next, the above-described scan-signal supply circuit will be explained in detail with reference to FIGS. 1 to 5. FIG. 3 is a timing chart of a data signal, scan signals, and the like in a comparative example. FIG. 4 is a schematic of a middle-stage wave circuit and the scan-signal supply circuit in this exemplary embodiment and FIG. 5 is a timing chart of a data signal, scan-signals, and the like in this exemplary embodiment.

In this exemplary embodiment, all the pixel electrodes 9*a* are driven using potentials with the same polarity in the same field and also field inversion driving in which the potentials are inverted in a field period. That is, image signals supplied from the data-signal supply circuit 101 are image signals that are AC-inverted for each field unit.

In FIG. 2, the gate of the TFT 30 that is connected to a pixel electrode B, located in the mth row, of the pixel electrodes 9*a*, is indicated as a gate 402, and a scan signal that is supplied to the gate 402 is indicated as a scan signal Gm. Meanwhile, the gate of the TFT 30 that is connected to a pixel electrode C, located in the (m+1)th row, of the pixel electrodes 9*a*, is indicated as a gate 404, and a scan signal that is supplied to the gate 404 is indicated as a scan signal Gm+1.

In the configuration shown in FIG. 2, the scan line 3*a* through which the scan signal Gm is supplied is overlapped by a portion E, shown by hatching, of the pixel electrode C in the next row. Since the interlayer insulating film provided between the overlapping portions is relatively thin, a parasitic capacitance is generated therebetween. In addition, with regard to the drain of the TFT 30, the data line 6*a*, and the capacitance line 300, a parasitic capacitance is generated to a greater or lesser degree between them and the pixel electrode C in the next row.

Thus, with this configuration, if scan signals Gm, Gm+1, . . . , each having a pulsed rectangular-wave, are supplied from the scan-signal supply circuit 104 such that the TFTs 30 in the (m+1)th row are put into the ON state at a moment when the TFTs 30 in the mth row are put into the OFF state, then the aforementioned parasitic capacitance causes scan signals, image signals, and the like in the (m+1)th row to be introduced as noise into the pixel potential of the pixel electrode B in the mth row.

More specifically, referring to FIG. 3, a shift-register circuit creates the basic waveform P1 for the scan signals G1 to Gm from a clock signal. The basic waveform P1 is a transfer output that is shifted in the order of the scan signals G1 to Gm. When the gate 404 for the pixel electrode C is opened at the rising edge 454 of the scan signal Gm+1 at a moment when the gate 402 for the pixel electrode B is about to close at the falling edge 452 of the scan signal Gm, a voltage at the pixel electrode C changes via the gate 404 and the voltage changes causes, for example, the potential of the scan signal Gm to change due to the aforementioned parasitic capacitance. As a result, for example, the falling edge 452 of the scan signal Gm fluctuates like a curve 456, thereby preventing the gate 402 of the pixel electrode B from closing. Thus, an image signal 464 to be written into the pixel electrode C is also introduced as noise into an image signal 462 to be written into the pixel electrode B. Such a change in writing potential causes pixel irregularities, since the aforementioned parasitic capacitance has irregularities for each pixel unit. With regard to an image (data) signal Sn shown in FIG. 3, due to the field inversion driving, the image signal 462 and the image signal 464 have the same polarity relative to, for example, a 0-V reference voltage 458.

Additionally, in the case of the comparative example shown in FIG. 3, in practice, the waveforms of the scan signals Gm, Gm+1, . . . are rounded depending on the wiring capacitances of the corresponding scan lines 3*a*. Thus, depending on the degree to which the waveforms of scan signals are rounded, the ON/OFF timings of the TFTs 30 are different from each other between the peripheral portion and the center portion in the lateral direction in FIGS. 1 and 2. As a result, noise influences that are caused by the next-row scan signal introduced into an image signal at a moment when the TFTs 30 are turned off, as described above, are different from each other between the peripheral portion and the center portion. Thus, in particular, in the case in which AC inversion driving in which a drive potential for each pixel electrode is inverted in a field period or the like is adopted, when the potential or the like of scan signals is adjusted such that such noise does not cause DC components to be generated in drive potentials at the center portion of the image display area, DC components are generated at the peripheral portion due to such noise. Conversely, when the potential or the like of scan signals is adjusted such that such noise does not cause DC components to be generated in drive potentials at the peripheral portion, DC components are generated at the center portion due to such noise.

From the results described above, according to the comparative example shown in FIG. 3, pixel irregularities occur and also flicker is generated at the peripheral or center portion.

In contrast, in this exemplary embodiment, particularly as shown in FIGS. 4 and 5, the scan-signal supply circuit 104 is configured so that a power-supply voltage Vdd2, which is to be supplied to buffer circuits 508 at its final stage, is changed by a middle-stage wave circuit 550 to two values, i.e., a voltage Vm and a voltage Vc1. With regard to the individual scan lines, in the middle of changing the potential of the scan signals G1 to Gm from a high potential Vc1 to a low potential 0, the potential of the scan signals G1 to Gm is held to an intermediate potential Vm for a predetermined period. Further, with regard to the individual scan lines, in the middle of changing the potential of the scan signals G1 to Gm from the low potential 0 to the high potential Vc1, the potential of the scan signals G1 to Gm is held to the intermediate potential Vm for a predetermined period.

The detailed configurations and operations of the scan-signal supply circuit 104 and the middle-stage wave circuit 550 configured as described above are described further below with reference to FIGS. 4 and 5.

Referring to FIG. 4, the scan-signal supply circuit 104 includes a shift-register circuit 504, inverter circuits 506, and buffer circuits 508. The shift-register circuit 504 creates the basic waveform P1 for the scan signals G1 to Gm, in accordance with a clock signal Vdd1. The basic waveform P1 is a transfer output that is shifted in the order of the scan signals G1 to Gm. The basic waveform P1 is passed through the inverter circuits 506 and the buffer circuits 508 to become the scan signals G1 to Gm each having a two-stage waveform as shown in FIG. 5.

The middle-stage wave circuit 550 includes a D/A converter (DAC) 520, variable registers 522, 528, and 530, an amplifier 524, transistors 532, 534, and 536, and a pulse generator circuit 526.

To determine the intermediate potential Vm, an output of the D/A converter 520 is input to the variable resistor 522. This is intended to allow the D/A converter 520 to determine an analog potential (A) from a digital signal (D) and to further allow the variable resistor 522 to also determine a potential. The impedance of an output of the variable resistor 522 is converted by the amplifier 524. An output of the amplifier 524 is set as the intermediate potential Vm.

Meanwhile, in accordance with the clock signal Vdd1, the pulse generator circuit 526 generates a pulse that rises with time ta later than the basic waveform P1 rises and that falls time tb earlier than the basic waveform P1 falls. In this case, the time ta and time tb can be changed by the variable resistors 528 and 530. An output of the pulse generator circuit 526 is passed through the transistor 532, thereby generating a pulse whose peak voltage is the intermediate potential Vm. The voltage level of this pulse is shifted by the transistor 534 and is further converted by the transistor 536 into a pulse whose peak voltage is the power-supply voltage Vc1 and whose lowest voltage is the intermediate potential Vm.

In this manner, the middle-stage wave circuit 550 generates a power-supply voltage Vdd2 as shown in FIG. 5. This power-supply voltage Vdd2 has a pulse whose lowest potential is the intermediate potential Vm, rises with the time ta later than the basic waveform P1 rises, reaches the peak-voltage power-supply voltage Vc1, falls with the time tb earlier than the basic waveform P1 falls, and reaches the intermediate potential Vm. The image signal Sn includes the falling edge of the pulse of the power-supply voltage Vdd2.

Such a power-supply voltage Vdd2 is input as a high-power supply to the source of a complementary TFT of each buffer circuit 508. In response, since the inverted waveform of the basic waveform P1 is input to the gate of the complementary TFT of each buffer circuit 508, an output of the buffer circuit 508 has a waveform in which those waveforms are combined. That is, outputs of the buffer circuits 508 become scan signals G1, G2, . . . having the two-stage waveform 604 shown in FIG. 5. More specifically, the scan signals G1, G2, . . . having the two-stage waveforms 604 start from a ground reference voltage (0 V), rise at substantially the same time the basic waveform P1 rises, and reach the intermediate potential Vm. In this case, the scan signals are held to the intermediate potential Vm during the time ta. After the time ta, the scan signals further reach the potential of the power-supply voltage Vc1 and are held. This causes the gates of the pixel-switching TFTs to open, thereby starting the writing of the image signal Sn. Thereafter, the scan signals G1, G2, . . . fall with the time tb earlier than the basic waveform P1 falls and reach the intermediate potential Vm. The scan signals G1, G2, . . . fall to the ground reference potential (0 V) at substantially the same timing when the basic waveform P1 falls. Since the image signal Sn includes the falling edge of the scan signals, the gates of the pixel-switching TFTs are closed, thereby ending the writing of the image signal Sn.

The intermediate potential Vm of the scan signals G1, G2, . . . , which are generated as described above to have the two-stage waveform, is set to a potential that puts the corresponding TFTs 30 into an incomplete ON state. Thus, when a component of a scan signal, image signal, or the like in the (m+1)th row is introduced due to the aforementioned parasitic capacitance as a noise component into a scan signal, image signal, or the like in the mth row, a potential variation due to the noise component can be reduced, compared to the case of the comparative example, shown in FIG. 3, in which the switching is performed directly between the complete ON state and the complete OFF state.

Referring to FIGS. 1 and 2, as described above, at the time of turning off the TFTs 30 in the mth row, even when a scan signal or the like in the (m+1)th row is introduced as noise due to the aforementioned parasitic capacitance, this exemplary embodiment can reduce the amount of variation in the pixel potentials, which are essentially to be held by the corresponding image electrodes 9*a*, using the scan signals G1 to Gm having a two-stage waveform. Thus, pixel irregularities that occur in an image that is ultimately displayed can be reduced. In particular, even when the aforementioned parasitic capacitance is increased as a result of a reduction in the pixel pitch, an adverse effect therefrom on image quality can be reduced. In addition, when AC inversion driving is adopted, flicker can be reduced in both the center and peripheral portions of the image display area. Thus, eventually, it is possible to display a high-quality image having reduced image irregularities and flicker.

In the exemplary embodiment described above, the pixel-switching TFTs 30 are top-gate TFTs, but also may be bottom-gate TFTs. In addition, the TFTs 30 may be configured so as to include a single-crystal semiconductor layer using a bonding SOI (silicon on insulator) technology. Each switching TFT 30 preferably has an LDD (lightly doped drain) structure. The switching TFT 30, however, may have an offset structure in which no impurity ions are implanted into a lightly-doped source region 1*b* and a lightly-doped drain region 1*c* or may have a self-aligned TFT in which impurity ions are implanted using a gate electrode provided by a part of the scan line 3*a* as a mask and heavily-doped source and drain regions are formed in a self-aligned manner. In addition, this embodiment has a single-gate structure in which only one gate electrode of the pixel-switching TFT 30 is arranged between the heavily-doped source region 1*d* and the heavily-doped drain region 1*e*. Two or more gate electrodes, however, may also be arranged between those regions. Additionally, the advantages of reducing pixel irregularities and flicker according to this embodiment can equally be provided even when the present invention is applied to a reflective-type liquid-crystal device as well as a projection-type or transmissive-type liquid-crystal device.

Second Exemplary Embodiment

Figure 6:
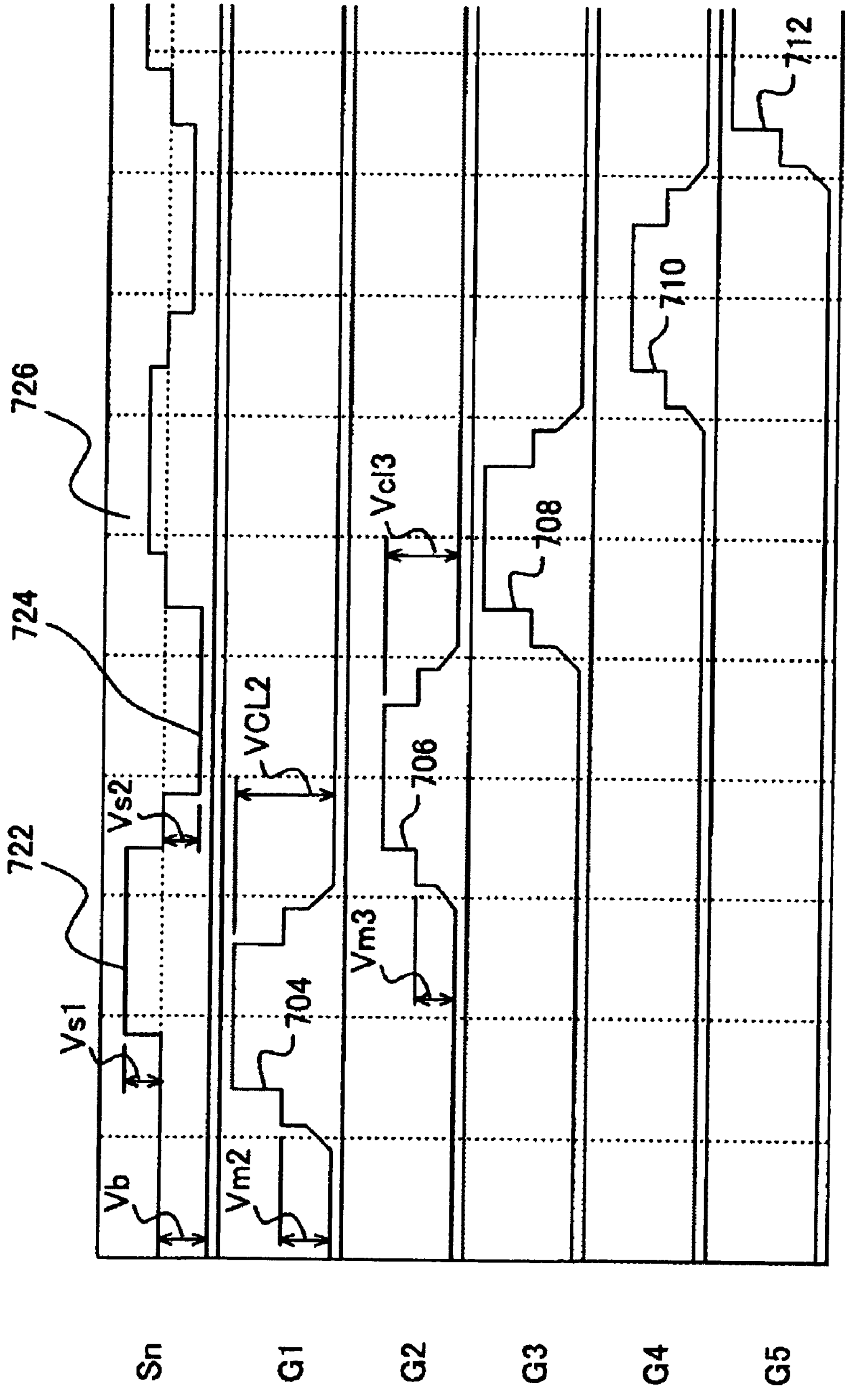
FIG. 6 is a timing chart showing the timings of a data-line drive signal and scan signals in a second exemplary embodiment of the present invention.
Figure 7:
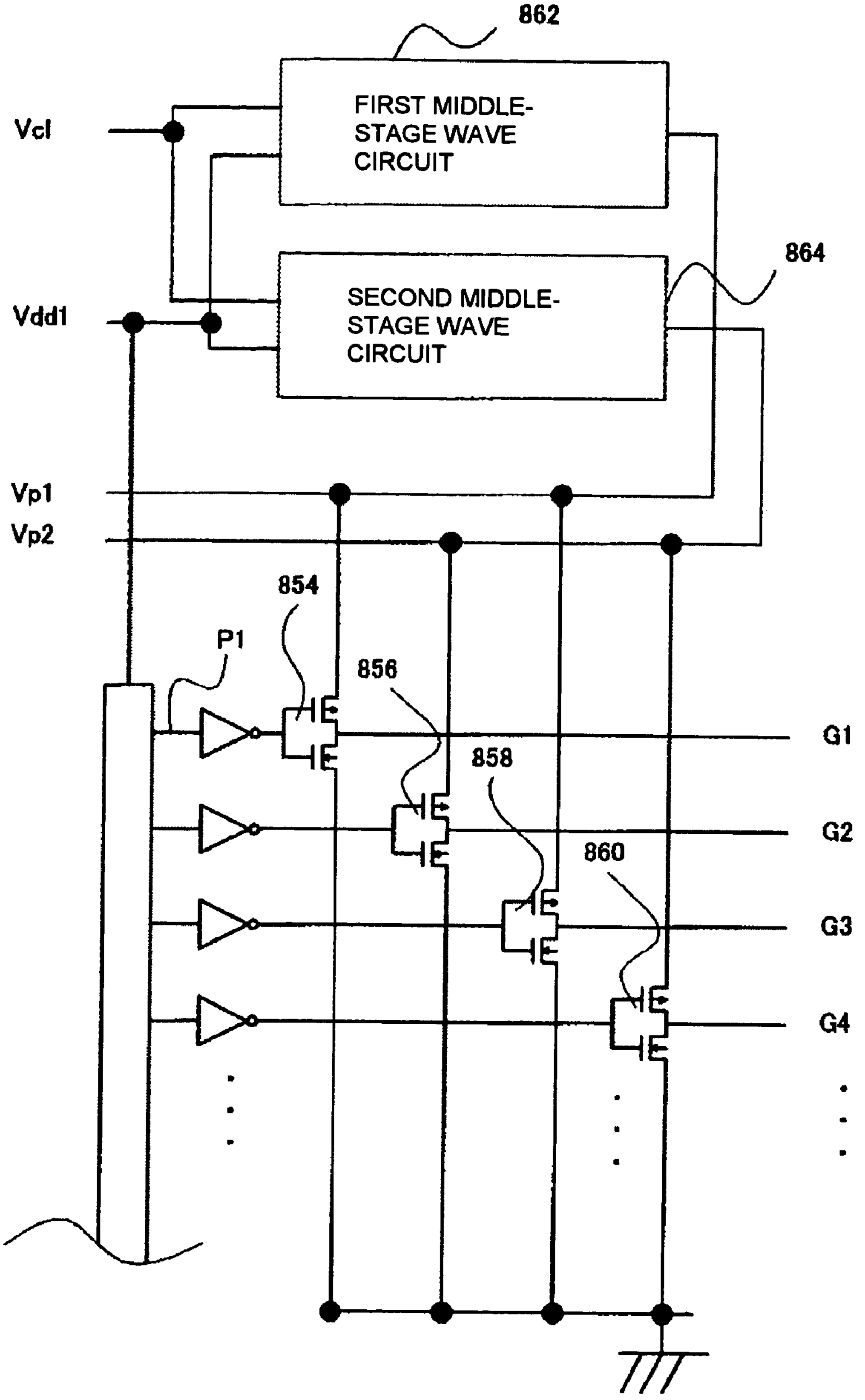
FIG. 7 is a schematic of middle-stage wave circuits and a scan-signal supply circuit in the second exemplary embodiment.

A second exemplary embodiment of the electro-optical device is described below with reference to FIGS. 6 and 7. FIG. 6 is a timing chart showing the timings of a data-line drive signal and scan signals in the second embodiment. FIG. 7 is a schematic showing a scan-signal supply circuit and middle-stage wave circuits that are configured to generate two types of scan signals in this exemplary embodiment.

In the second exemplary embodiment, the pixel electrodes 9*a* in the same row are driven by potentials having the same polarity and 1H inversion driving in which the potential polarities are inverted for each row in a field period is performed. That is, image signals supplied from the data-signal supply circuit 101 are signals whose polarities are inverted for each field unit. This can effectively prevent deterioration resulting from application of a DC voltage to the liquid crystal. The basic configuration of the electro-optical device of this second exemplary embodiment is analogous to that of the first exemplary embodiment described with reference to FIGS. 1 and 2.

That is, as shown in FIG. 6, in the second exemplary embodiment, the image signal Sn is inverted in its potential polarity relative to a fixed potential Vb for each horizontal-scanning period. More specifically, in FIG. 6, in the first horizontal-scanning period, a writing potential 722 of the image signal Sn is higher than the fixed potential Vb by Vs1, and in the next horizontal-scanning period, a writing potential 724 of the image signal Sn is lower than the fixed potential Vb by Vs2. Further, in the next horizontal-scanning period, a writing potential 726 of the image signal Sn is higher than the fixed potential Vb by Vs1.

In the second exemplary embodiment, since such image signal Sn is used to perform display, the scan lines are separated into odd-numbered rows and even-numbered rows which are constantly driven with the same potential polarities, in order to cope with the introduction of inter-row noise and/or rounding of the waveform of a scan signal due to the aforementioned parasitic capacitance. This arrangement makes it possible to further reduce adverse effects caused by the noise and/or waveform rounding. In the second exemplary embodiment, therefore, the middle-stage wave circuit in the first embodiment shown in FIG. 4 is separated into a section for the scan lines in the odd-numbered rows and a section for the scan lines in the even-numbered rows.

That is, as shown in FIG. 7, a first middle-stage wave circuit 862 supplies power-supply voltages to buffer circuits 854, 858, . . . that are connected to the odd-numbered-row scan lines, and a second middle-stage wave circuit 864 supplies power-supply voltages to buffer circuits 856, 860, . . . that are connected to even-numbered-row scan lines.

The first middle-stage wave circuit 862 has a configuration similar to that of the middle-stage wave circuit 550 described in the first exemplary embodiment, and generates a peak voltage Vcl2 and an intermediate potential Vm2 from the power supply voltage Vc1 and the clock signal Vdd1. A specific value of the intermediate potential Vm2 may be empirically or experimentally determined by observing the state of flicker.

As shown in FIG. 6, for a first medium-stage wave Vp1 corresponding to the scan signal G1, time ta and time tb, in which the peak voltage Vcl2 and the intermediate potential Vm2 are held, are set so as to reduce flicker. The scan signals G1, G3, G5, . . . having respective two-stage waveforms 704, 708, 712, . . . are supplied to the corresponding odd-numbered-row scan lines. On the other hand, scan signals G2, G4, . . . having respective two-stage waveforms 706, 710, . . . , which have a peak voltage Vcl3 and an intermediate potential Vm3, as a second middle-stage wave Vp2 are supplied to the corresponding even-numbered-row scan lines, as in the case of odd-numbered scan lines. A specific value of the intermediate potential Vm3 can also be experimentally or empirically determined by observing the state of flicker. In this manner, the intermediate potentials of the first and second middle-stage waves are set to be different from each other and the high potentials of the first and second middle-stage waves are set to be different from each other.

Even with the 1H inversion drive system, as described above, at the time of turning off the mth-row TFTs 30, even when a scan signal or the like in the (m+1)th row is introduced as noise due to the aforementioned parasitic capacitance, this exemplary embodiment can reduce the amount of variation in the pixel potentials, which are essentially to be held by the corresponding image electrodes 9*a*, using the scan signals G1, G2, . . . having a two-stage waveform. Thus, pixel irregularities that occur in an image that is ultimately displayed can be reduced. In particular, flicker can be reduced at both the center portion and the peripheral portions of the image display area. Thus, eventually, it is possible to display a high-quality image having reduced pixel irregularities and flicker.

In the 1H inversion drive system in this exemplary embodiment, the polarity of the drive voltage may be inverted for each every row or may be inverted for every two adjacent rows or for every multiple number of rows.

(Exemplary Modifications)

Although the intermediate potentials are set by the D/A converter and the variable resistors in each exemplary embodiment described above, they may be set by detecting pixel irregularities and flicker before shipment or during normal operation, automatically generating a digital signal depending on the degree of detection, and inputting the digital signal to the D/A converter 520.

In each exemplary embodiment described above, the setting of the hold time of intermediate potentials of the scan signals having the two-stage waveform, i.e., the setting of time ta or time tb, is changed with the variable resistors 528 and 530. The time ta and time tb, however, may also be set by detecting pixel irregularities and flicker, automatically generating a digital signal depending on the degree thereof, inputting the digital signal to the D/A converter, and inputting the resulting output analog voltage to the pulse generator circuit 526.

In this manner, detecting pixel irregularities and flicker and controlling the two-stage waveform of the scan signals can advantageously cope with pixel irregularities and/or flicker resulting from product variations and aging.

Additionally, while the falling edge and the rising edge each have one intermediate potential in each exemplary embodiment described above, instead, setting multiple intermediate potentials to generate scan signals, each having a multi-stage waveform, can also provide similar advantages.

(Entire Exemplary Configuration of Electro-Optical Device)

Figure 8:
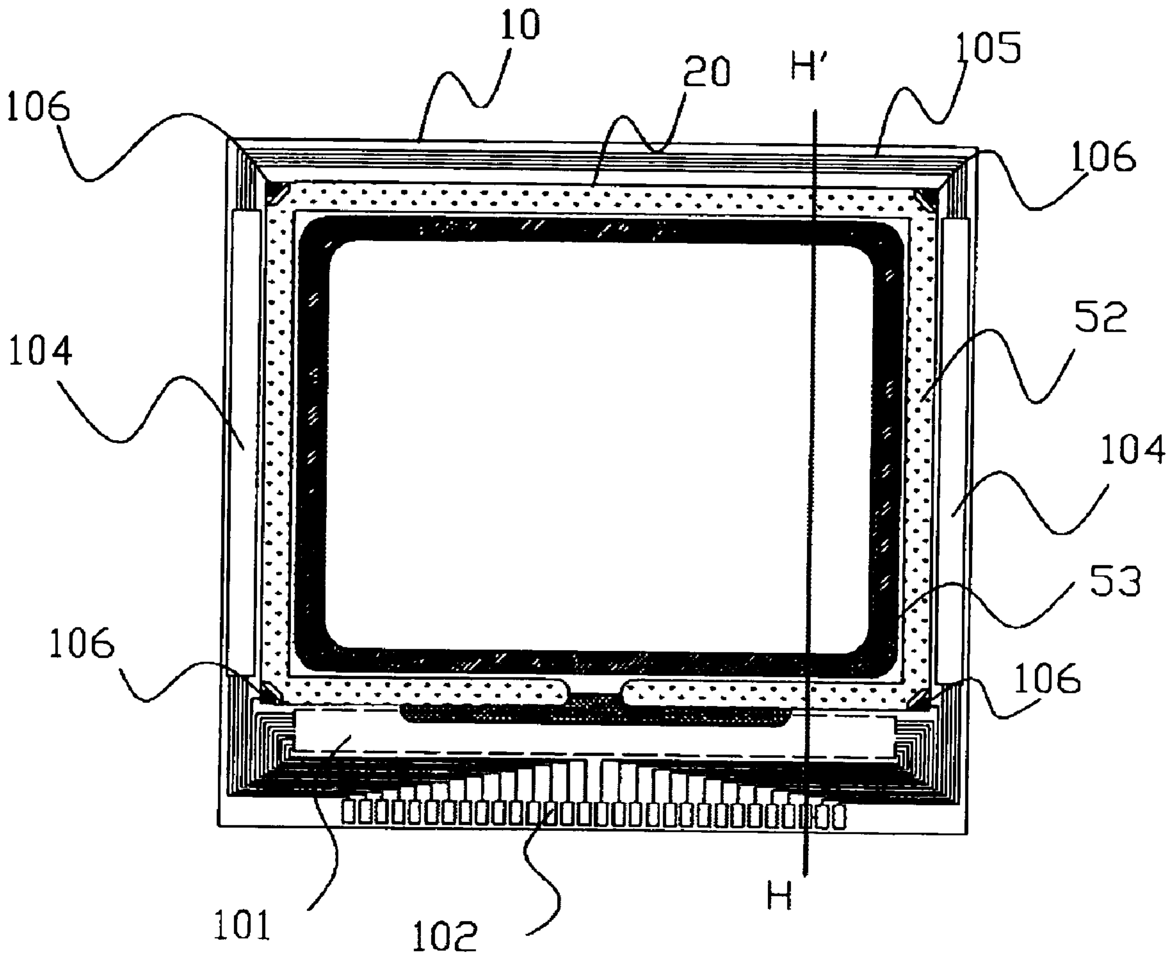
FIG. 8 is a plan view of a TFT-array substrate in the electro-optical device of this exemplary embodiment and various elements formed thereon, which is viewed from the side of the opposing substrate.
Figure 9:
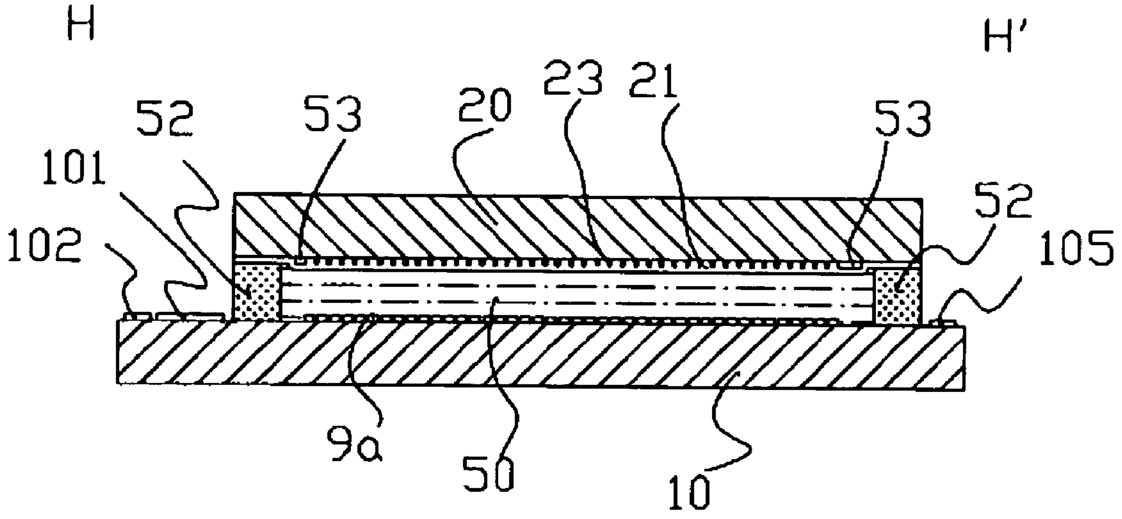
FIG. 9 is a cross-sectional view taken along plane H-H' shown in FIG. 8.

The entire exemplary configuration of the electro-optical device of each exemplary embodiment configured described above is described below with reference to FIGS. 8 and 9. FIG. 8 is a plan view of the TFT-array substrate 10 and individual elements formed thereon, viewed from the side of an opposing substrate 20. FIG. 9 is a cross-sectional view taken along plane H–H' shown in FIG. 8.

Referring to FIG. 8, a sealant 52 is provided on the TFT-array substrate 10 along the edge, and a light-shielding film 53 is provided in parallel to the inner side of the sealant 52 so as to serve as a frame defining the periphery of an image display area 10*a*. The data-signal supply circuit 101 and an outer-circuit connecting terminal 102 are provided at regions outside the sealant 52 along one side of the TFT-array substrate 10. Along two sides adjacent to the one side is provided the scan-signal supply circuits 104. If delay of scan signals supplied to the scan lines 3*a* is not a problem, it goes without saying that the scan-signal supply circuit 104 may be provided at only one side. The data-signal supply circuits 101 may also be arranged at two sides along edges of the image display area 10*a*. Along the remaining side of the TFT-array substrate 10 is provided a plurality of wires 105 for providing connections between the scan-signal supply circuits 104 provided at the opposing two sides of the image display area 10*a*. A conductive material 106 is provided at at least one of the corner portions for the opposing substrate 20 to provide electrical connection between the TFT-array substrate 10 and the opposing substrate 20. As shown in FIG. 9, the opposing substrate 20, which has substantially the same contour as the sealant 52 shown in FIG. 8, is secured to the TFT-array substrate 10 with the sealant 52.

On the TFT-array substrate 10, a precharge circuit to supply precharge signals, which precede image signals and have a predetermined voltage level, to the plurality of data lines 6*a*; and an inspection circuit to inspect the quality, a defect, and the like of the electro-optical device during manufacture or shipment; and the like may also be provided, in addition to the data-signal supply circuit 101, the scan-signal supply circuit 104, and the like.

In the exemplary embodiments described above with reference to FIGS. 1 to 9, instead of providing the data-signal supply circuit 101 and the scan-signal supply circuit 104 on the TFT-array substrate 10, for example, electrical and mechanical connection may be provided for a drive LSI that is mounted on a TAB (tape automated bonding) substrate via an anisotropic conductive film that is provided at the peripheral portion of the TFT-array substrate 10. Depending on the operation modes, such as a TN (twisted nematic) mode, STN (super twisted nematic) mode, VA (vertically aligned) mode, or PDLC (polymer dispersed liquid crystal) mode and a normally white mode or normally black mode, a polarizing film, a retardation film, a polarizer, or the like is arranged in a predetermined direction on one side, to which light enters, of the opposing substrate 20, and on one side, from which light is emitted, of the TFT-array substrate 10.

The electro-optical device according to the exemplary embodiments described above is applied to a projector and thus three electro-optical devices are used as respective light valves for RGB. Individual color light rays, which are divided by a dichroic mirror to divide RGB colors, enter the corresponding light valves as projection light rays. Thus, in each exemplary embodiment, no color filter is provided on the opposing substrate 20. However, an RGB color filter, together with its protection film, may be formed on the opposing substrate 20 in a predetermined region that opposes the pixel electrode 9*a*. With this arrangement, the electro-optical device of each embodiment can be applied to a direct-viewing-type or reflective-type color electro-optical device, other than a projector. Micro-lenses may also be formed on the opposing substrate 20 such that each micro-lens corresponds to one pixel. Alternatively, a color filter layer can be formed with a color resist under the pixel electrodes 9*a* that oppose RGB elements on the TFT-array substrate 10. With this arrangement, the collection efficiency of incident light is enhanced, which can achieve a bright electro-optical device. In addition, a number of interference layers whose refractive indexes are different from each other may be deposited on the opposing substrate 20 to form a dichroic filter that creates RGB colors by utilizing light interference. The use of the opposing substrate with the dichroic filter can achieve a brighter color electro-optical device.

(Exemplary Embodiment of Electronic Apparatus)

Figure 10:
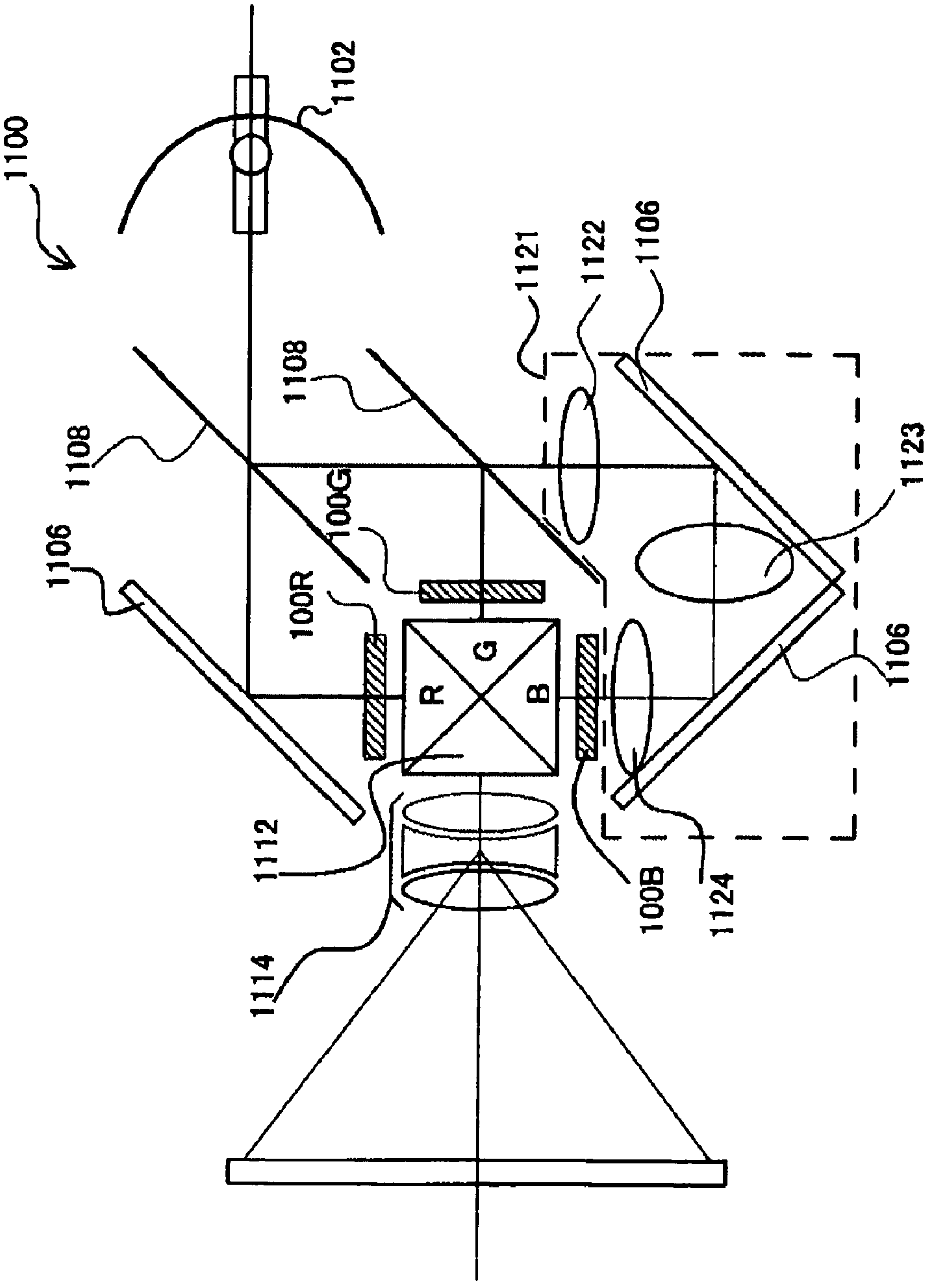
FIG. 10 is a schematic sectional view showing a color liquid-crystal projector, which is one example of a projection-type color display apparatus, according to an exemplary embodiment of an electronic apparatus of the present invention.

Next, a description is given to the entire configuration and, particularly, the optical configuration of an exemplary embodiment of a projection-type color display apparatus that is one example of an electronic apparatus using the electro-optical device detailed above as a light valve. FIG. 10 is a schematic sectional view of a projection-type color display apparatus.

Referring to FIG. 10, a liquid crystal projector 1100, which is one example of a projection-type color display apparatus of this exemplary embodiment, is configured in such a manner that three liquid-crystal modules, each including a liquid crystal device 100 in which a drive circuit is mounted on a TFT-array substrate, are prepared and used as light valves 100R, 100G, and 100B for respective RGB. In the liquid crystal projector 1100, when projection light is emitted from a lamp unit 1102 which includes a white light source such as a metal halide lamp, three mirrors 1106 and two dichroic mirrors 1108 divide the projection light into R, G, and B light components corresponding the three primary colors R, G, and B. The three R, G, and B light components are then introduced into the light valves 100R, 100G, and 100B, respectively. In this case, to reduce or prevent optical loss due to a long optical path, the B light ray is particularly introduced through a relay lens system 1121, which includes a light-entrance lens 1122, a relay lens 1123, and a light-emission lens 1124. Light components that are modulated by the corresponding light valves 100R, 100G, and 100B and that correspond to the three primary colors are again combined by a dichroic prism 1112. Subsequently, the resulting components are projected as a color image onto a screen 1120 via a projection lens 1114.

The present invention is not limited to the exemplary embodiments described above. The present invention, therefore, can be changed as appropriate without departing from the scope or sprit of the present invention which can be read from the entire description and claims and an electro-optical device, a drive device and a drive method therefor, and an electronic apparatus which involve such a change are also embraced by the technical scope of the present invention.

What is claimed is:

1. An electro-optical device, comprising:

a substrate;

a plurality of pixel electrodes arranged in a matrix above the substrate;

thin-film transistors provided above the substrate to control switching of the pixel electrodes;

scan lines provided above the substrate to supply scan signals to put the thin-film transistors into an ON state or an OFF state to gates of the thin-film transistors;

data lines provided above the substrate to supply image signals to the pixel electrodes through sources and drains of the thin-film transistors when the thin-film transistors are put into the ON state; and a scan-signal supply circuit that line-sequentially supplies the scan signals to the scan lines and holds the potential of the scan signals, in the middle of changing the potential of the scan signals from a high potential that puts the thin-film transistors into the ON state to a low potential that puts the thin-film transistors into the OFF state and in the middle of changing the potential of the scan signals from the low potential to the high potential, to an intermediate potential between the high potential and the low potential for a predetermined period;

the scan-signal supply circuit supplying the scan signals so that, a period in which, of two scan signals supplied to the adjacent scan lines, one scan signal that precedes is changed from the intermediate potential to the low potential, and a period in which the other scan signal that follows is changed from the low potential to the intermediate potential overlap each other.

2. The electro-optical device of claim 1, intermediate potential being set to a potential that puts the thin-film transistors into an incomplete ON state.

3. The electro-optical device of claim 1, in the middle of changing the potential of the scan signals from the high potential to the low potential, the scan-signal supply circuit holding the potential of the scan signals to a plurality of potentials for respective predetermined periods, the plurality of potentials being different from each other and including the intermediate potential; and, in the middle of changing the potential of the scan lines from the low potential to the high potential, the scan-signal supply circuit holding the potential of the scan signals to a plurality of potentials for respective predetermined periods, the plurality of potentials being different from each other and including the intermediate potential.

4. The electro-optical device of claim 1, the scan-signal supply circuit including:

a shift-register circuit that sequentially outputs a transfer signal to the scan lines;

an output circuit that line-sequentially outputs the scan signals to the scan lines in response to input of the transfer signal; and a power-supply changing circuit that changes an external power supply to define the high potential at output sides of the output circuit to two values.

5. The electro-optical device of claim 4, the output circuit including at least one of inverter circuits and buffer circuits which include complementary transistor circuits having high potential sides that are connected to the external power supply.

6. The electro-optical device of claim 4, the power-supply changing circuit including a switch that switches and outputs two power supplies.

7. The electro-optical device of claim 4, the power-supply changing circuit including a programmable digital-to-analog converter that switches and outputs two power supplies.

8. The electro-optical device of claim 4, the output circuit including a first section that sequentially outputs the scan signals to the odd-numbered-row scan lines of the plurality of scan lines and a second section that sequentially outputs the scan signals to the even-numbered-row scan lines of the plurality of scan lines, and the power-supply changing circuit causing the first section and the second section to change the external power supply into two values, respectively.

9. The electro-optical device of claim 1, further comprising:

an opposing substrate, which opposes the substrate; and an electro-optic material layer that is sandwiched between the substrate and the opposing substrate.

10. A drive device for an electro-optical device, the drive device comprising:

a substrate;

a plurality of pixel electrodes arranged in a matrix above the substrate;

thin-film transistors provided above the substrate to control switching of the pixel electrodes;

scan lines provided above the substrate to supply scan signals to put the thin-film transistors into an ON state or an OFF state to gates of the thin-film transistors;

data lines provided above the substrate to supply image signals to the pixel electrodes through sources and drains of the thin-film transistors when the thin-film transistors are put into the ON state; and a scan-signal supply circuit that holds the potential of the scan signals, in the middle of changing the potential of the scan signals from a high potential that puts the thin-film transistors into the ON state to a low potential that puts the thin-film transistors into the OFF state and in the middle of changing the potential of the scan signals from the low potential to the high potential, to an intermediate potential between the high potential and the low potential for a predetermined period, the scan-signal supply circuit supplying the scan signals so that, a period in which, of two scan signals supplied to the adjacent scan lines, one scan signal that precedes is changed from the intermediate potential to the low potential, and a period in which the other scan signal that follows is changed from the low potential to the intermediate potential overlap each other.

11. The drive device of claim 10, the scan-signal supply circuit including:

a shift-register circuit that sequentially outputs a transfer signal to the scan lines;

an output circuit that line-sequentially outputs the scan signals to the scan lines in response to input of the transfer signal; and a power-supply changing circuit that changes an external power supply to define the high potential at output sides of the output circuit to two values.

12. The drive device of claim 10, further comprising an image-signal supply circuit that supplies the image signals to the data lines.

13. A drive method for an electro-optical device in which scan signals to put thin-film transistors into an ON state or an OFF state are supplied to the gates of the thin-film transistors, the method comprising:

holding the scan signals to an intermediate potential from a low potential for a predetermined period;

holding the scan signals to a high potential from the intermediate potential for a predetermined period;

holding the scan signals to the intermediate potential from the high potential for a predetermined period;

changing the scan signals from the intermediate potential to the low potential; and supplying the scan signals so that, a period in which, of two scan signals supplied to the adjacent scan lines, one scan signal that precedes is changed from the intermediate potential to the low potential, and a period in which the other scan signal that follows is changed from the low potential to the intermediate potential overlap each other.

14. The drive method of claim 13, finlher including setting the intermediate potential to a potential that puts the thin-film transistors into an incomplete ON state.

15. The drive method of claim 13, the electro-optical device including a plurality of scan lines that are line-sequentially driven, and settings of intermediate potentials of the scan signals for scan lines that are adjacent to each other are different from each other.

16. The drive method of claim 13, the electro-optical device including a plurality of scan lines that are line-sequentially driven, and settings of high potentials of the scan signals for scan lines that are adjacent to each other are different from each other.

17. An electronic apparatus, comprising:

an electro-optical apparatus that includes:

a substrate;

a plurality of pixel electrodes arranged in a matrix above the substrate;

thin-film transistors provided above the substrate to control switching of the pixel electrodes;

scan lines provided above the substrate to supply scan signals to put the thin-film transistors into an ON state or an OFF state to gates of the thin-film transistors;

data lines provided above the substrate to supply image signals to the pixel electrodes through sources and drains of the thin-film transistors when the thin-film transistors are put into the ON state; and a scan-signal supply circuit that line-sequentially supplies the scan signals to the scan lines and holds the potential of the scan signals, in the middle of changing the potential of the scan signals from a high potential that puts the thin-film transistors into the ON state to a low potential that puts the thin-film transistors into the OFF state and in the middle of changing the potential of the scan signals from the low potential to the high potential, to an intermediate potential between the high potential and the low potential for a predetermined period, the scan-signal supply circuit supplying the scan signals so that, a period in which, of two scan signals supplied to the adjacent scan lines, one scan signal that precedes is changed from the intermediate potential to the low potential, and a period in which the other scan signal that follows is changed from the low potential to the intermediate potential overlap each other.

* * * * *